(12) United States Patent
Kimball et al.

(10) Patent No.: US 10,893,670 B2
(45) Date of Patent: *Jan. 19, 2021

(54) ANIMAL TRAP

(71) Applicants: Quade A. Kimball, Alpena, MI (US);
Shawn W. Inglis, Harrisville, MI (US);
Ralph W. Inglis, Harrisville, MI (US)

(72) Inventors: Quade A. Kimball, Alpena, MI (US);
Shawn W. Inglis, Harrisville, MI (US);
Ralph W. Inglis, Harrisville, MI (US)

(73) Assignee: QSR OUTDOOR PRODUCTS, INC., Alpena, MI (US)

( * ) Notice: Subject to any disclaimer, the term of this patent is extended or adjusted under 35 U.S.C. 154(b) by 31 days.

This patent is subject to a terminal disclaimer.

(21) Appl. No.: 15/949,418

(22) Filed: Apr. 10, 2018

(65) Prior Publication Data
US 2018/0220640 A1     Aug. 9, 2018

Related U.S. Application Data

(63) Continuation of application No. 13/800,550, filed on Mar. 13, 2013, now Pat. No. 10,021,873.

(51) Int. Cl.
*A01M 23/34* (2006.01)
*A01M 23/24* (2006.01)

(52) U.S. Cl.
CPC .......... *A01M 23/24* (2013.01); *A01M 23/245* (2013.01); *A01M 23/34* (2013.01)

(58) Field of Classification Search
CPC ...... A01M 23/00; A01M 23/34; A01M 23/24; A01M 23/245

USPC ........................ 43/85–87, 96, 97, 58, 61, 77
See application file for complete search history.

(56) References Cited

U.S. PATENT DOCUMENTS

| | | | | | |
|---|---|---|---|---|---|
| 45,399 | A | * | 12/1864 | Eddy | A01M 23/24 43/86 |
| 116,743 | A | * | 7/1871 | Ovaitt | A01M 23/24 43/86 |
| 122,318 | A | * | 1/1872 | Hart | A01M 23/24 43/86 |
| 465,056 | A | * | 12/1891 | Edwards | A01M 23/24 43/86 |
| 551,412 | A | * | 12/1895 | Stephens | A01M 23/24 43/86 |
| 600,156 | A | * | 3/1898 | Mast | A01M 23/24 43/85 |
| 872,041 | A | * | 11/1907 | Armstrong | A01M 23/24 43/86 |
| 895,017 | A | * | 8/1908 | Hooker | A01M 23/24 43/86 |

(Continued)

FOREIGN PATENT DOCUMENTS

| CA | 1 225 830 | 8/1987 |
|---|---|---|
| CA | 1225830 A1 * | 8/1987 |

(Continued)

OTHER PUBLICATIONS

Duke DP Coon Trap (1 page).

*Primary Examiner* — Darren W Ark
(74) *Attorney, Agent, or Firm* — Flynn Thiel, P.C.

(57) ABSTRACT

An animal trap having an enclosure body, a restraint, and a latching and triggering mechanism is provided. A method of using this animal trap is also provided.

19 Claims, 10 Drawing Sheets

(56) References Cited

U.S. PATENT DOCUMENTS

| | | | | |
|---|---|---|---|---|
| 1,054,344 A * | 2/1913 | Fikes | A01M 21/00 | 43/77 |
| 1,139,849 A * | 5/1915 | Collins | A01K 31/16 | 119/340 |
| 1,366,282 A * | 1/1921 | Ropp | A01M 23/00 | 43/61 |
| 1,630,798 A * | 5/1927 | Morelli | A01M 23/12 | 43/60 |
| 1,861,312 A * | 5/1932 | Magee | A01M 23/34 | 43/77 |
| 1,899,641 A * | 2/1933 | Schwartz | A01M 23/34 | 43/86 |
| 1,913,823 A * | 6/1933 | Witte | A01M 23/18 | 43/61 |
| 1,951,296 A * | 3/1934 | Kleffman | A01M 23/00 | 43/85 |
| 2,231,191 A * | 2/1941 | Martino | A01M 23/02 | 43/66 |
| 2,233,628 A * | 3/1941 | Meik | A01M 23/24 | 43/86 |
| 2,348,002 A * | 5/1944 | Glass | A01M 23/34 | 43/86 |
| 2,422,602 A * | 6/1947 | Vallely | A01M 23/24 | 43/85 |
| 2,437,020 A * | 3/1948 | Ford | A01M 23/18 | 43/61 |
| 2,492,957 A * | 1/1950 | Blair | A01M 23/24 | 43/120 |
| 2,534,358 A * | 12/1950 | Lehn | A01M 23/18 | 43/85 |
| 2,544,026 A * | 3/1951 | Kern | A01M 23/18 | 43/61 |
| 2,589,002 A * | 3/1952 | Vonada | A01M 23/18 | 43/61 |
| 2,733,542 A * | 2/1956 | Ostermeyer | A01M 23/14 | 43/83.5 |
| 2,752,723 A * | 7/1956 | Lutsky | A01M 23/00 | 43/83 |
| 2,789,691 A * | 4/1957 | Dobratz | B65D 85/00 | 206/320 |
| 2,894,352 A * | 7/1959 | McDonald | A01M 23/34 | 43/87 |
| 2,995,861 A * | 8/1961 | Osborn | A01M 23/18 | 43/66 |
| 3,488,878 A * | 1/1970 | Morodomi | A01M 23/24 | 43/86 |
| 4,158,929 A * | 6/1979 | Custard | A01M 23/24 | 43/58 |
| 4,471,560 A * | 9/1984 | Hughan | A01M 23/34 | 43/85 |
| 4,601,128 A * | 7/1986 | Danison | A01M 23/34 | 43/82 |
| 4,735,011 A * | 4/1988 | Spillett | A01M 23/30 | 43/86 |
| 4,744,170 A * | 5/1988 | Chow | A01M 23/20 | 43/61 |
| 4,787,170 A * | 11/1988 | Kingsbury | A01M 23/18 | 43/58 |
| 4,802,301 A * | 2/1989 | Isborn | A01M 23/24 | 43/58 |
| 5,175,957 A * | 1/1993 | West | A01M 23/16 | 43/61 |
| 5,309,667 A * | 5/1994 | Ladzinski | A01M 23/34 | 43/85 |
| 5,367,820 A * | 11/1994 | Lafforthun | A01M 23/02 | 43/60 |
| 5,809,688 A * | 9/1998 | Wallen | A01M 23/18 | 43/60 |
| 6,658,787 B1 * | 12/2003 | Bonnot | A01M 23/26 | 43/58 |
| 7,543,407 B2 * | 6/2009 | McCulloch | A01M 23/24 | 43/85 |
| 7,918,050 B2 * | 4/2011 | Sturgeon | A01M 23/34 | 43/85 |
| 8,230,642 B2 * | 7/2012 | Ziegmann | A01M 23/245 | 43/58 |
| 8,371,062 B2 * | 2/2013 | Ziegmann | A01M 23/245 | 43/61 |
| 8,484,886 B2 * | 7/2013 | Stephens | A01M 23/34 | 43/82 |
| 8,881,447 B2 * | 11/2014 | Stephens | A01M 23/34 | 43/81 |
| 8,898,952 B2 * | 12/2014 | Stephens | A01M 23/34 | 43/81 |
| 9,282,733 B2 * | 3/2016 | Love | B66F 15/00 | |
| 9,781,917 B1 * | 10/2017 | Pribyl | A01M 23/00 | |
| 10,021,873 B2 * | 7/2018 | Kimball | A01M 23/24 | |
| 2009/0313879 A1 * | 12/2009 | Vasyl | A01M 23/34 | 43/87 |
| 2011/0265368 A1 * | 11/2011 | DeMers | A01M 23/34 | 43/87 |
| 2011/0289821 A1 * | 12/2011 | Bonnot | A01M 23/24 | 43/86 |
| 2012/0060405 A1 | 3/2012 | Stephens | | |
| 2014/0026466 A1 * | 1/2014 | Ziegmann | A01M 23/24 | 43/92 |
| 2015/0272107 A1 * | 10/2015 | Henry | A01M 23/245 | 43/81 |
| 2019/0335739 A1 * | 11/2019 | Allen | A01M 23/24 | |

FOREIGN PATENT DOCUMENTS

| | | | | |
|---|---|---|---|---|
| DE | 511 605 | | 10/1930 | |
| DE | 511605 C | * | 10/1930 | A01M 23/34 |
| DE | 9309382 U1 | * | 10/1993 | A01M 23/24 |
| DE | G 93 09 382.9 | | 11/1993 | |
| FR | 945 122 | | 4/1949 | |
| FR | 945122 A | * | 4/1949 | A01M 23/34 |
| GB | 203 484 | | 9/1923 | |
| GB | 203484 A | * | 9/1923 | A01M 23/24 |
| GB | 389 410 | | 3/1933 | |
| GB | 389410 A | * | 3/1933 | A01M 23/24 |
| JP | 4-91743 | | 3/1992 | |
| JP | 04091743 A | * | 3/1992 | |
| JP | 2829670 | | 9/1998 | |
| JP | 2829670 B2 | * | 11/1998 | |
| JP | 2006-006234 A | | 1/2006 | |
| JP | 2006006234 A | * | 1/2006 | |
| JP | 2008-200019 A | | 9/2008 | |
| JP | 2008200019 A | * | 9/2008 | |
| JP | 2012-55210 A | | 3/2012 | |
| JP | 2012055210 A | * | 3/2012 | |
| WO | WO 01/76363 A1 | | 10/2001 | |
| WO | WO-0176363 A1 | * | 10/2001 | A01M 23/34 |
| WO | WO-2006130095 A1 | * | 12/2006 | A01M 23/24 |

* cited by examiner

ANIMAL TRAP

CROSS-REFERENCE TO RELATED APPLICATION

This is a continuation of prior U.S. application Ser. No. 13/800,550, filed Mar. 13, 2013, which issued as U.S. Pat. No. 10,021,873.

BACKGROUND OF THE INVENTION

The present invention generally relates to animal traps, and more particularly to live animal traps which trap the paw or lower leg of an animal.

Various wild animals, especially animals like raccoons, often need to be captured so they can be either relocated from one area to another, or killed. Such capture of these wild animals requires baiting and trapping the animals.

Various traps have been designed to capture such animals. One such type of trap includes a spring loaded trigger which can be activated by the paw of an animal. When the spring loaded trigger is moved in a certain direction, a restraining member is moved to trap a paw or lower leg of the animal such that it cannot release itself from the trap. A spring biases the retainer against the paw or lower leg with enough force to retain the animal until the trapper releases the animal. However, such traps are very difficult to set due to the large biasing force of the springs needed to adequately hold the lower leg or paw of an animal such that the animal cannot release itself.

An embodiment of the present invention is an animal trap that includes an enclosure body having a first side and a second side and at least one wall, the wall having at least one upper aperture and at least one lower aperture therein; a set dog connected to the enclosure body, the set dog adjacent the first side of the enclosure body and having a latch portion and a leg connected to the latch portion; a trigger having a first end and a second end, the first end adjacent the leg of the set dog and the second end inside the enclosure body; a setting member, such as a plate, which engages the latch portion of the set dog and is capable of disengaging from the latch portion; a restraint extending through the upper aperture of the enclosure body and having an engagement portion inside the enclosure body, the restraint being connected to the setting member; and a biasing member which biases a portion of the setting member away from the enclosure body and biases the restraint toward the first side of the enclosure body.

Another embodiment is an animal trap having an enclosure body; a set dog adjacent to and connected to a first side of the enclosure body, the set dog having a latch portion adjacent its upper end and adjacent a top of the enclosure body; a trigger extending into the enclosure body and having an end adjacent the set dog; a setting member for engagement and disengagement with the latch portion of the set dog and connected to a restraint that extends into the interior of the enclosure body; and a biasing member which biases the restraint toward one side of the enclosure body.

Another embodiment of the present invention is a method for using an animal trap which comprises the steps of providing an animal trap having: an enclosure body having an interior, a set dog adjacent to and connected to the enclosure body, the set dog having a latch portion and a leg, a trigger having a blade extending into the interior of the enclosure body and an end adjacent the leg of the set dog and capable of moving the leg, a setting member capable of engaging with the latch portion of the set dog and connected to a restraint, and a biasing member which biases the restraint in a direction transverse to the longitudinal axis of the enclosure body; moving at least a portion of the setting member toward the enclosure body to engage the portion of the setting member with the latch of the set dog until the trap is in a set position; and inserting a bait into the interior of the enclosure body such that an animal can reach it and move the blade of the trigger. Trigger movement causes the trigger to engage a portion of the leg and move the set dog sufficiently to disengage the setting member from the latch of the set dog, the biasing member moving the restraint toward the rear side of the enclosure body.

Other advantages, objects and/or purposes of the invention will be apparent to persons familiar with constructions of this general type upon reading the following specification and inspecting the accompanying drawings.

BRIEF DESCRIPTION OF THE DRAWING FIGURES

DETAILED DESCRIPTION OF THE PREFERRED EMBODIMENT

Figure 5:
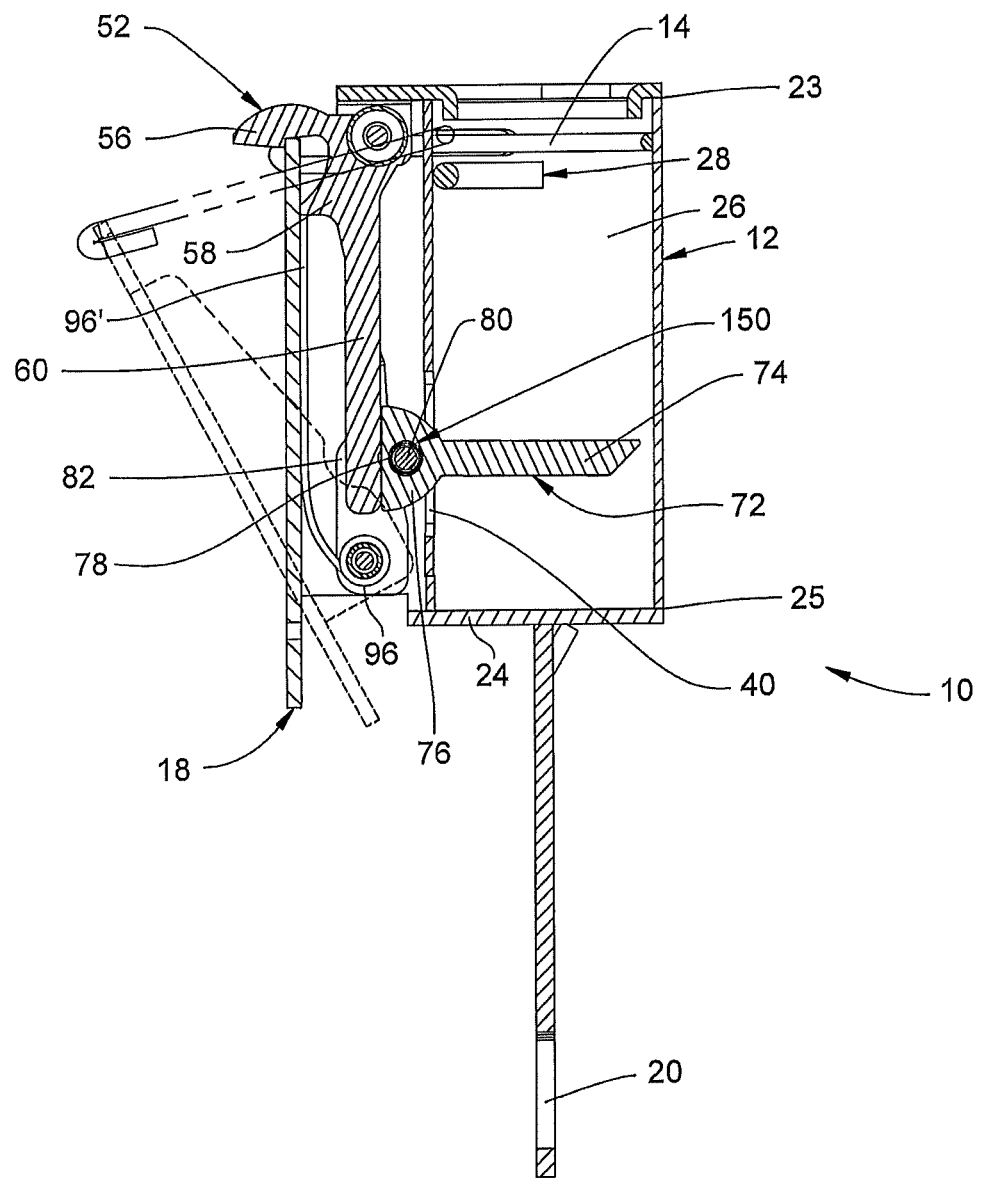
FIG. 5 is a cross-sectional side elevational view of the animal trap of FIG. 1 taken along the line V-V in FIG. 1.

For purposes of description herein, the terms "upper," "lower," "right," "left," "rear," "front," "vertical," "horizontal," and derivatives thereof shall relate to the animal trap embodiment as oriented in FIG. 5 with the front of the animal trap generally extending to the right of the page. However, it is to be understood that the invention may assume various alternative orientations, except where expressly specified to the contrary. It is also to be understood that the specific devices and processes illustrated in the attached drawings and described in the following description are exemplary embodiments of the inventive concepts defined in the appended claims. Hence, specific dimensions and other physical characteristics relating to the embodiments disclosed herein are not to be considered as limiting, unless the claims expressly state otherwise. The term "interior" is not meant to be limited to any particular shape of the given object, but instead refers to an unfilled space of an object. The animal trap of the present invention could include apparatus which are not entirely tubular, or are not completely enclosed on one side.

Figure 1:
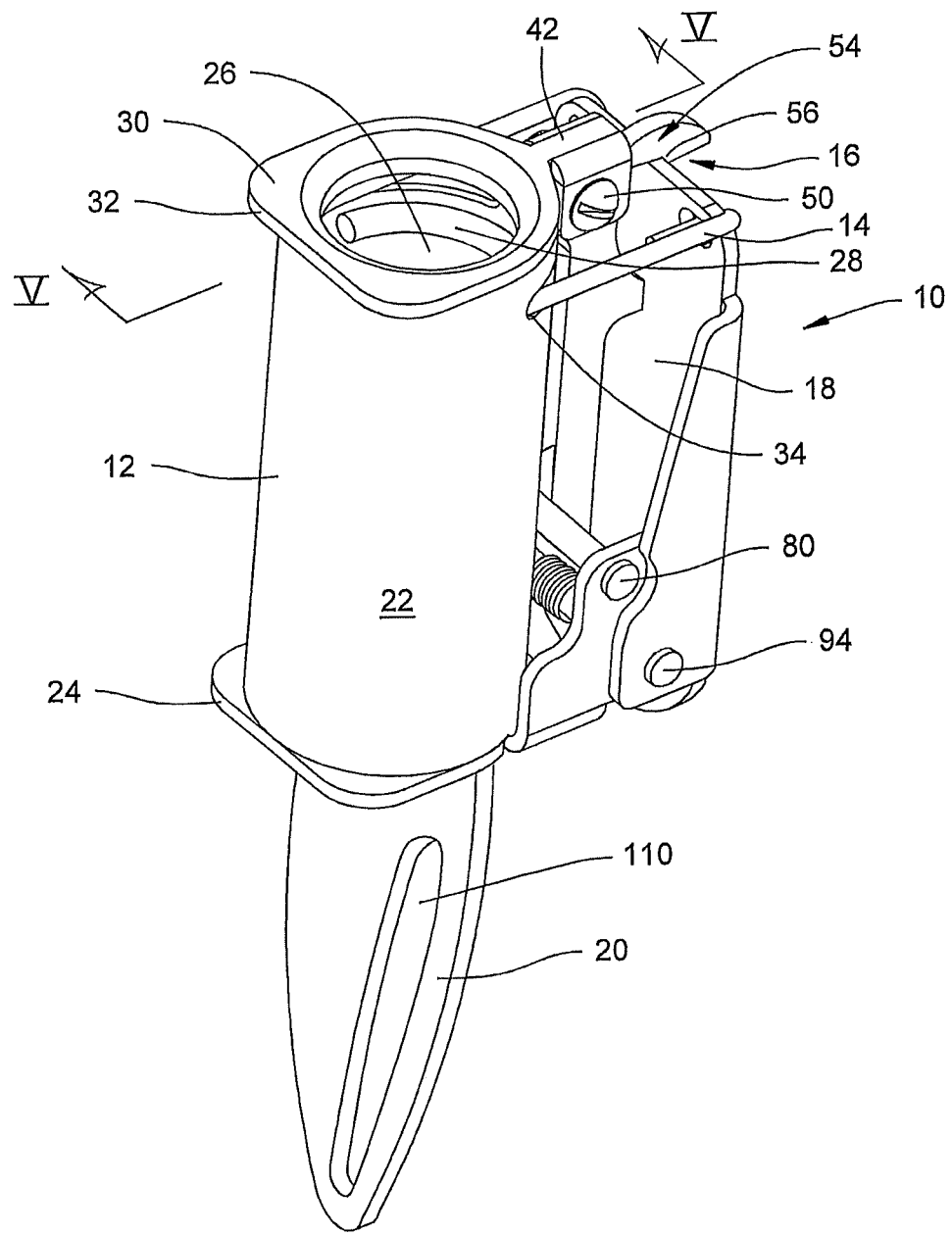
FIG. 1 is a perspective view of a first embodiment of an animal trap of the present invention.
Figure 2:
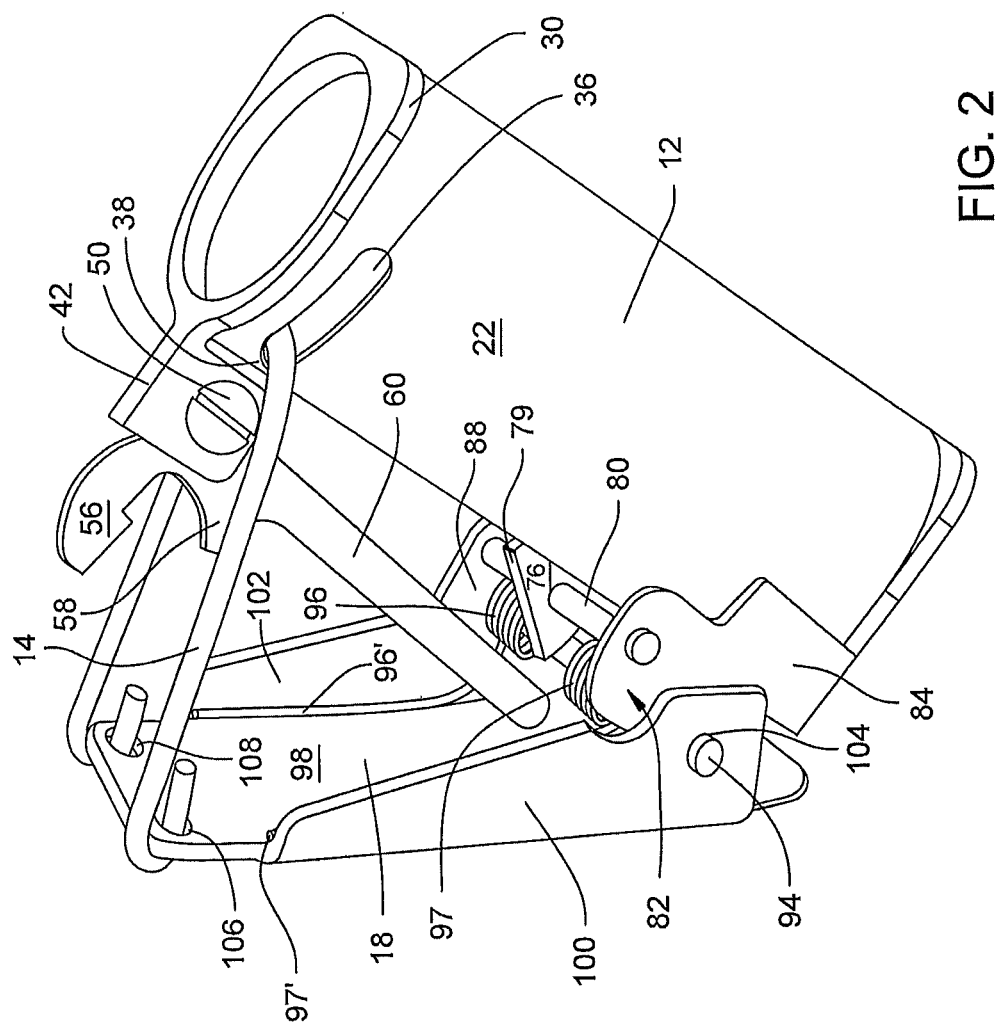
FIG. 2 is a side elevational perspective view of a portion of the animal trap of FIG. 1.
Figure 3:
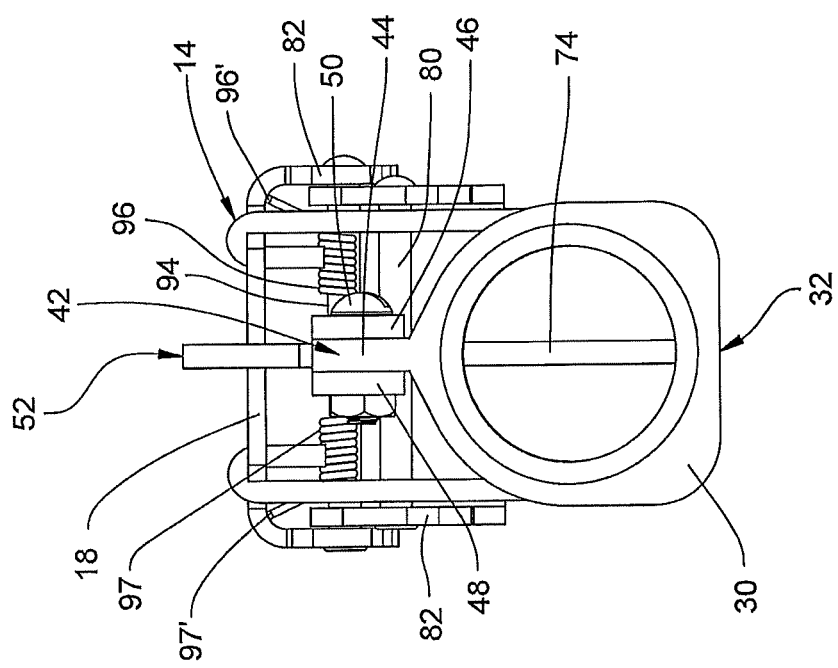
FIG. 3 is a top plan view of the animal trap of FIG. 1 in a set position.

As shown in FIGS. 1-3, a preferred animal trap 10 includes an enclosure body 12 or housing, a restraint 14, a latching and triggering mechanism 16, a setting plate 18, and a stake 20 for insertion into the ground or other object, and which can be used as a male member for connection to a base, which is described in more detail below.

The enclosure body 12 is preferably cylindrical in shape, but may be any other practical shape, including but not limited to rectangle, square, diamond or oval. The enclosure body 12 includes one or more walls 22, a bottom plate 24 and an interior 26. The piece of material forming wall 22 defines a top 23 and a bottom 25 (see FIG. 5). The bottom plate 24 is fixedly attached to the bottom 25. Although generally cylindrical in shape, the enclosure body has a front and a rear, defined by the majority of latching and triggering mechanism 16 and setting plate 18 being adjacent the rear of the enclosure body 12.

In the interior 26 of the enclosure body 12, an offset bar 28 is attached to the inside of the wall 22 toward the rear of the enclosure body 12. The offset bar 28 is preferably a piece of wire in an approximately semi-circular shape and is fixedly attached to the inside of the wall 22 of the enclosure body 12. The offset bar 28 keeps the paw or lower leg of an animal spaced slightly away from the inside of wall 22 to more effectively retain the paw or lower leg of the animal in the trap.

A top plate 30 is fixedly attached to the top 23 of the cylindrical wall 22 and is generally circular in shape with a flat front portion 32. The straight, flat front portion 32 allows a user to place the animal trap 10 on the ground (or an item adjacent the ground), with the front of the enclosure body 12 adjacent the ground and the front portion 32 of the top plate 30 abutting the ground or other object to allow a user to use his or her foot or hand to achieve extra leverage to set the trap without the trap rolling back and forth on the ground or other object.

In the wall 22 of the enclosure body 12, there are two apertures 34, 36 near the top 23 of the wall 22 (see FIGS. 1 and 2). The top apertures 34, 36 are preferably the same size as one another and symmetrically positioned with a central divider 38 therebetween (see FIG. 2). The apertures 34, 36 are sized and shaped to allow the restraint 14 to extend therethrough and to move from the front of the enclosure body 12 to the rear of enclosure body 12 and vice versa. When the restraint 14 is in its rearmost position, the restraint 14 is biased against a portion of the central divider 38. The enclosure body 12 also includes a lower aperture 40 in the wall 22 (see FIG. 5). The lower aperture 40 is generally vertical in nature and is located on the rear of the wall 22. The lower aperture 40 is sized and shaped to allow a trigger, discussed in more detail below, to extend therethrough and to move to an extent within the lower aperture 40.

Integrally formed with the top plate 30 is a dog post 42 (see FIGS. 1-3). The dog post 42 is located rearwardly of the wall 22 and extends downwardly in an inverted U shape. The dog post 42 has an upper portion 44 with opposing side members 46, 48 that depend from the top portion 44 and which define a space therebetween. Each side member 46, 48 has a bore therein (not shown) to allow a fastener 50, such as a bolt, to extend therethrough for attachment (along with use of a nut and washers) of a dog 52 thereto.

Figure 4:
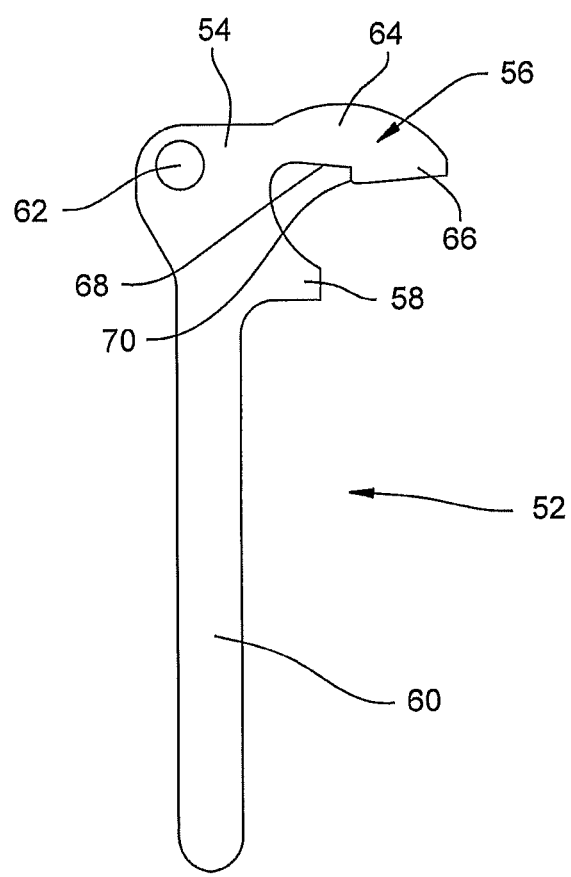
FIG. 4 is a side elevational view of a set dog of the animal trap of FIG. 1.

The dog 52 is rotatably or pivotably mounted to the dog post 42 about the fastener 50. The dog 52, shown in FIG. 4, includes a head portion 54, a latch 56 as part of the head portion 54, a press member 58, and a leg 60. The head portion 54 includes an aperture 62 therein designed to receive the fastener 50 such that the dog 52 can pivot thereabout. The latch 56 has a top portion 64 with an outer member 66 extending downwardly therefrom and an inner portion 68. The outer member 66 extends lower than the inner portion 68, creating a shoulder 70 therebetween. The press member 58 is located below the head 54 of the dog 52 and extends outwardly far enough to allow the setting plate 18 to abut the press member 58 and push the dog 52 forward when the trap 10 is being set. The press member 58 allows the top of the setting plate 18 to engage with the latch 56 regardless of the orientation of the trap 10. The leg 60 depends from the head portion 54, and is sized and shaped to engage with a portion of a trigger and, in turn, disengage the setting plate 18 from the latch 56 to "fire" the trap.

As shown best in FIG. 5, a trigger 72 extends through the lower aperture 40 in the enclosure body 12. The trigger 72 includes a blade portion 74, at least a majority of which resides in the interior 26 of the enclosure body 12, and a bow 76 at one end of the trigger 72 and which is connected to the blade portion 74. At least a majority of the bow 76 preferably resides outside of the enclosure body 12. The bow 76 has a centrally located hole 78 which receives a trigger rod 80. The trigger 72 is pivotally connected to the trigger rod 80, allowing the trigger blade 74 to pivot both upwardly and downwardly. The bow 76 of the trigger 72 is preferably approximately semi-circular in shape with a flat end 79 (see FIG. 2). However, it is contemplated that other shapes of the bow 76 can be used and configurations other than flat may be used for the end 79. In this embodiment, the end 79 of the trigger is configured to be able to push the leg 60 of the dog 52 outwardly when the trigger blade 74 is moved either in an upwardly or downwardly fashion.

Figure 6:
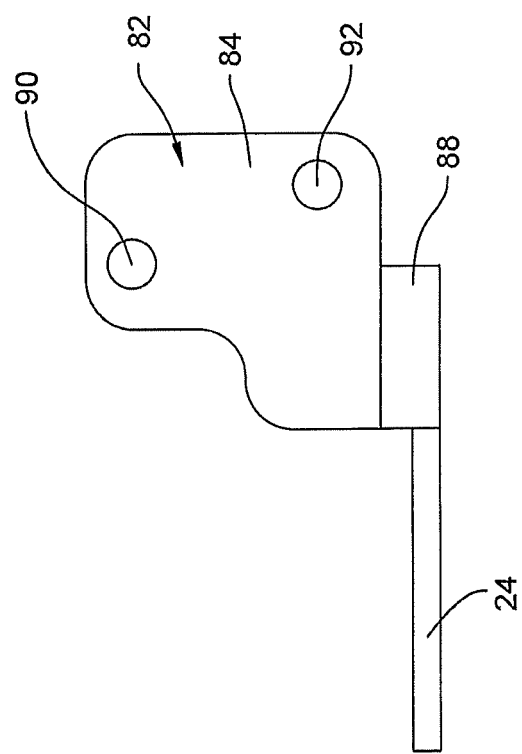
FIG. 6 is a side elevational view of a seating bracket of the animal trap of FIG. 1.

The trigger rod 80 is substantially perpendicular to the longitudinal axis of the enclosure body 12 and is attached to a seating bracket 82. The seating bracket 82 is generally U-shaped and unitary, and has side members 84, 86 and a bottom 88. A side view of the seating bracket 82, along with bottom plate 24, is shown in FIG. 6. Each side member 84, 86 includes an upper hole 90 through which the trigger rod 80 extends, and a lower hole 92 for receiving a spring rod 94. The spring rod 94 has two side-by-side torsion springs 96, 97 about it (see FIG. 2). The springs 96, 97 are each engaged with setting plate 18 by an arm 96', 97' such that the springs 96, 97 bias the top of the setting plate 18 away from the enclosure body 12.

The setting plate 18 generally has a main plate portion 98 and opposing wings 100, 102 (see FIG. 2). Each wing 100, 102 has an aperture 104 therein for receiving the spring rod 94 for attachment of the setting plate 18 to the spring rod 94. The apertures 104 are preferably in the lower portion of the wings 100, 102, allowing the bottom portion of setting plate 18 to rotate about the axis defined by the spring rod 94. The main plate portion 98 includes two apertures 106, 108 adjacent the top of the setting plate 18. Apertures 106, 108 oppose each other, are adjacent the sides of the main plate portion 98, and are each sized and shaped to receive a portion of the restraint 14 for attachment. Due to the attachment of the restraint 14 to the setting plate 18, when the setting plate 18 moves about the pivot rod 94, the restraint 14 moves in a direction that is substantially perpendicular to the longitudinal axis of the enclosure body 12. The main plate portion 98 preferably has enough surface area to allow a user's hand or foot to set the trap with relative ease.

Restraint 14 is preferably a U-shaped wire, which is attached to the setting plate 18, with an end of the wire attached using aperture 106 for attachment, and the other end of the wire attached using aperture 108 for attachment. The restraint 14 extends through aperture 34 in the wall 22, into the interior 26 of the enclosure body 12, and back through aperture 36, and out of the enclosure body 12. The central portion of the restraint 14 preferably has a shape similar to the wall 22 of the enclosure body 12, but having such a shape is not critical. The restraint 14 is such a length that the central portion is positioned adjacent the interior of the front of the enclosure body 12 when the trap 10 is in the set position, but will not abut against the wall such that there is interference with engagement of the setting plate 18 with the latch 56 of the dog 52.

The support stake 20 depends from the bottom plate (see FIG. 1). The support stake 20 preferably includes an elongated aperture 110 for allowing attachment to a chain or cable with a secondary stake (not shown) connected thereto. The support stake 20 is shaped to be capable of being easily forced into the ground when the ground is soft enough to allow such staking. If the ground does not permit such staking, a base 120 (described in more detail below), shown in FIG. 10, may be used.

Figure 7:
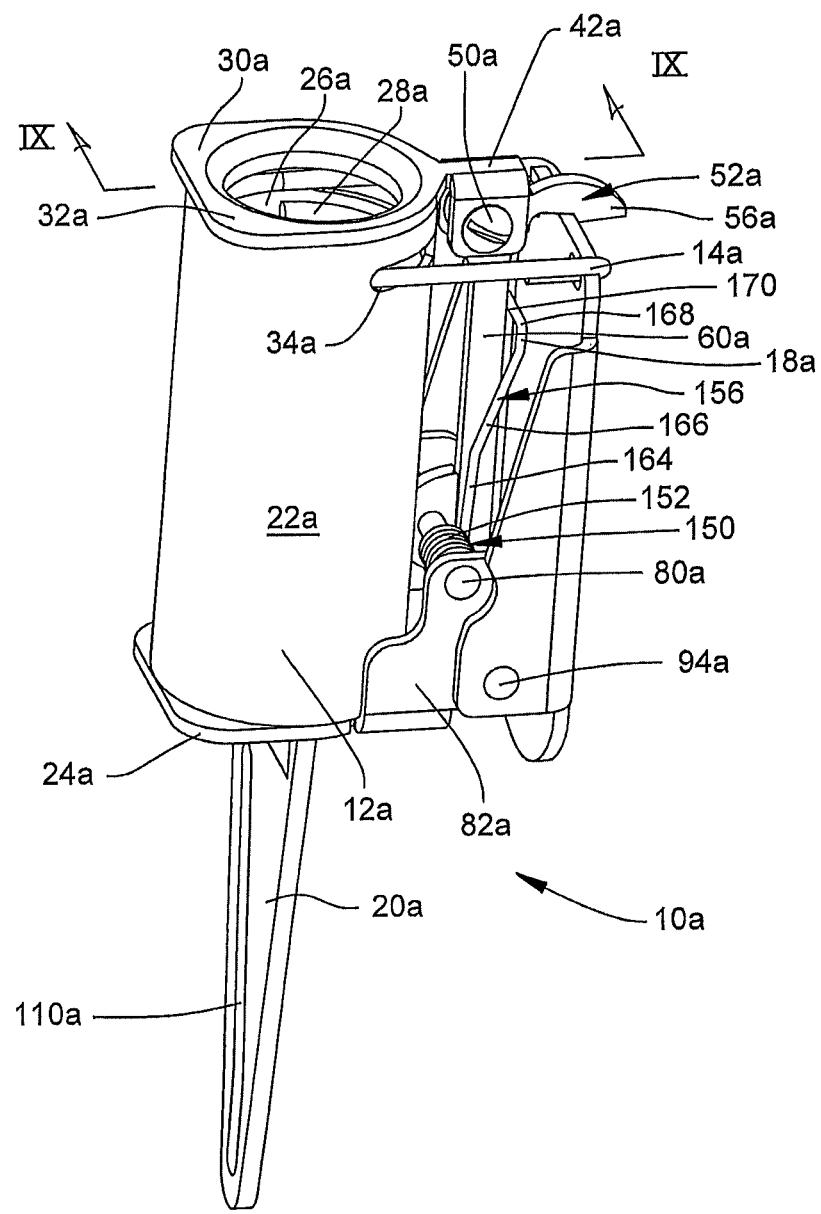
FIG. 7 is a perspective view of a second embodiment of an animal trap of the present invention.
Figure 8:
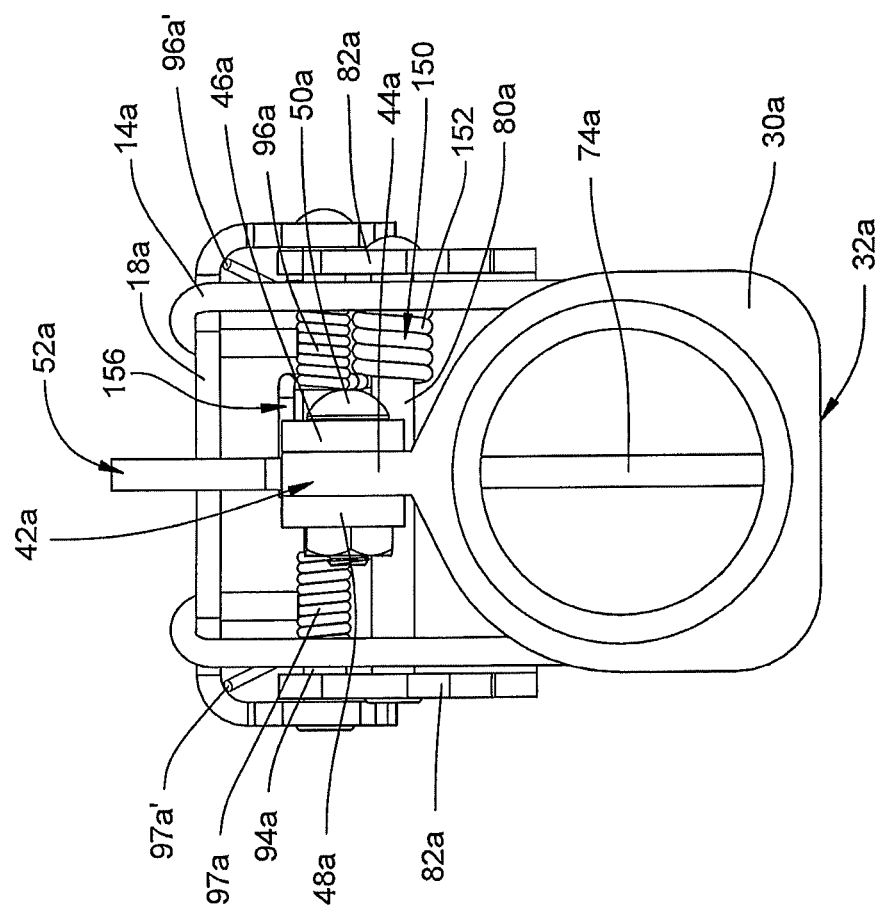
FIG. 8 is a top plan view of the animal trap of FIG. 7 in a set position.
Figure 9:
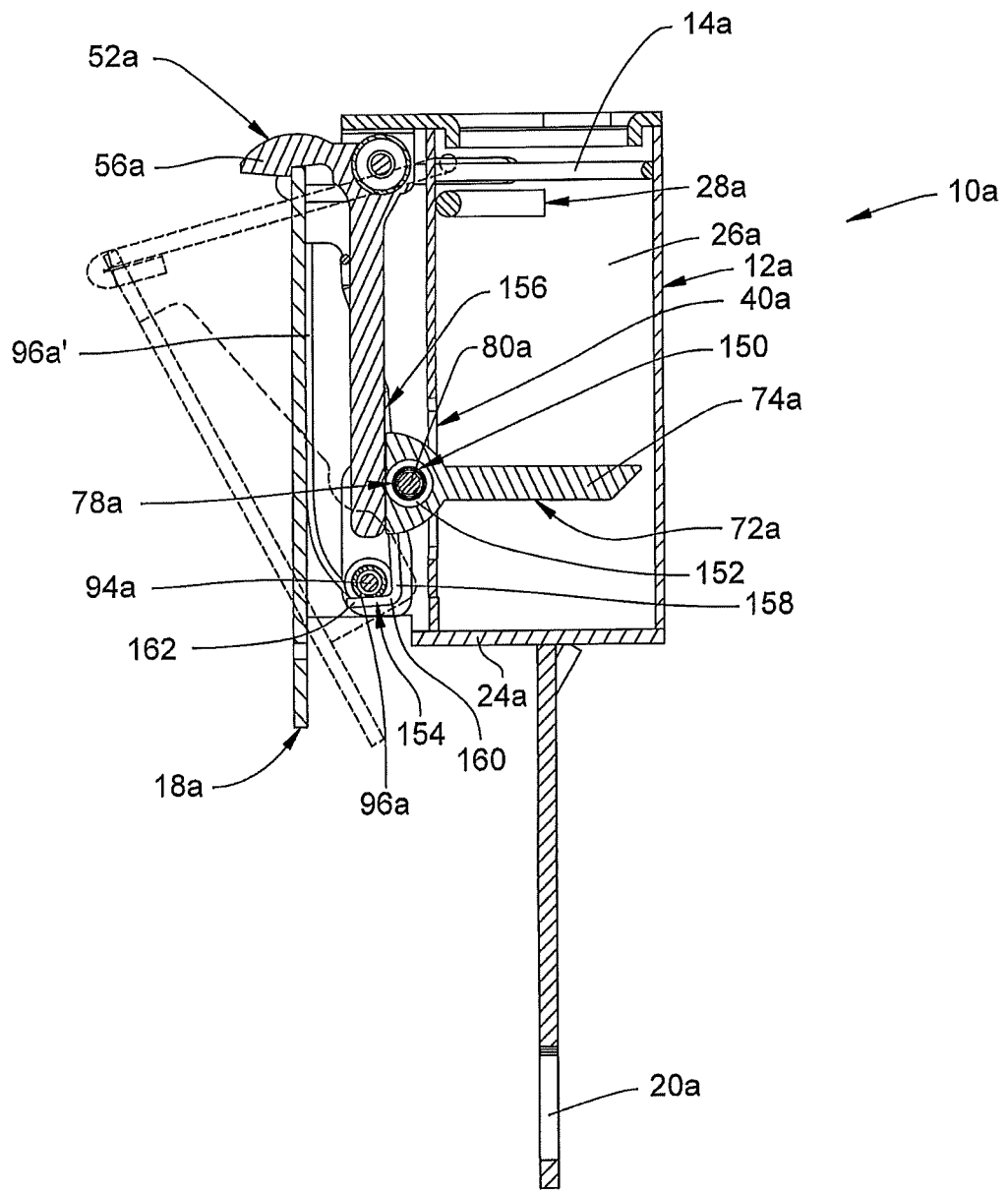
FIG. 9 is a cross-sectional side elevational view of the animal trap of FIG. 7 taken along the line IX-IX in FIG. 7.

The reference numeral 10a (FIGS. 7-9) generally designates another embodiment of the present invention, which is a second embodiment of an animal trap. Since animal trap 10a is similar to the previously described animal trap 10, similar parts appearing in FIGS. 1-6 are represented by the same, corresponding reference number except for the suffix "a" in the numerals of the latter.

The animal trap 10a has a similar structure to that of animal trap 10, except that the dog 52a of the animal trap 10a does not include a protruding member, such as press member 58 of dog 52. Animal trap 10a includes a second spring 150. Spring 150 includes a coil 152 which is coiled about rod 80a. The spring 150 further includes a generally downwardly projecting spring leg 154 and a generally upwardly projecting spring arm 156. The spring leg 154 includes a downwardly extending member 158, a bend 160, and a nearly horizontal member 162. Member 162 contacts rod 94a for biasing resistance (see FIG. 9). The spring arm 156 has generally upwardly projecting member 164, an angled member 166, a bend 168, and a substantially horizontal finger 170 (see FIG. 7). Finger 170 contacts the upper portion of leg 60a of the dog 52a to bias the leg 60a toward enclosure body 12a. This feature assists in the latching of the setting plate 18a with the latch 56a. In addition, even if the trap were to get rusty due to prolonged or excessive exposure to moisture, the spring 152 retains the dog 52a in the latching position when the trigger 74a is not activated.

Figure 10:
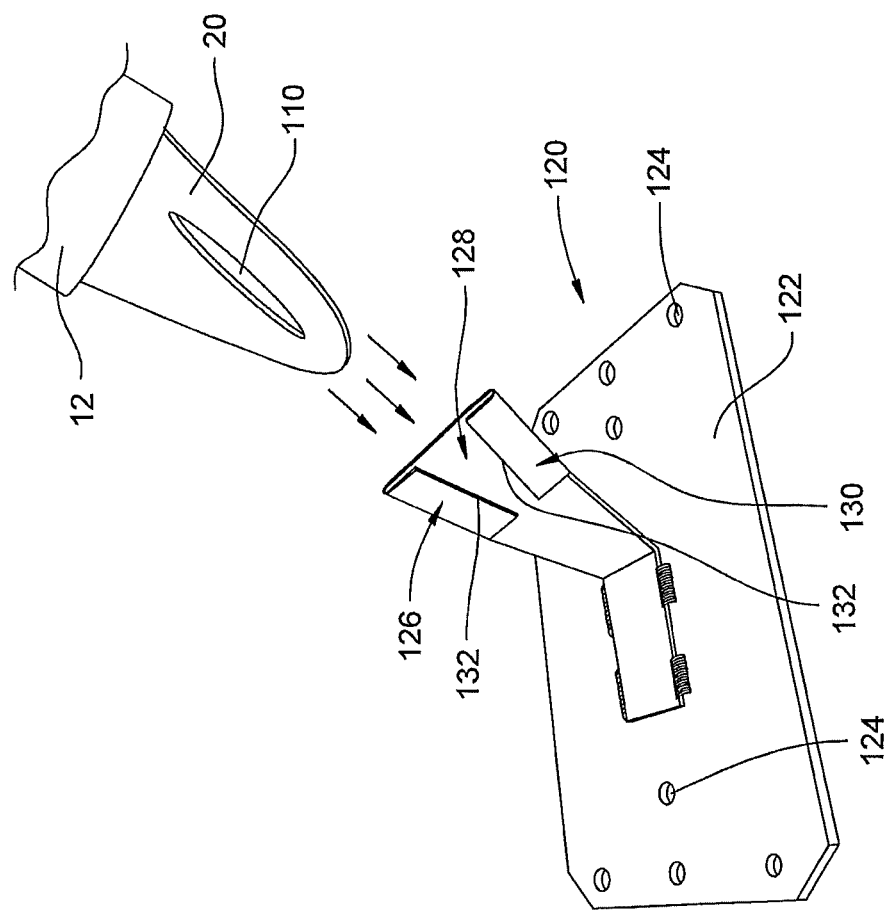
FIG. 10 is a top perspective view of an embodiment of a base for securing an animal trap.

The base 120, shown in FIG. 10, includes a base plate 122, which is generally flat and includes one or more apertures 124 for attachment to a tree or other structure. The base 120 also includes a holster 126 which is attached to and extends upwardly from the base plate 122, preferably at an angle in the range of 45-85° with respect to the base plate 122. The holster 126 includes an interior 128 defined by an outer wall 130, and preferably has a gap between edges 132 of the wall 130. The holster 126 is sized and shaped to receive the stake 20 or 20a therein and to hold the animal trap 10/10a in place.

The animal trap 10/10a is preferably made of metal such as steel, and fastener 50 is preferably of brass or another non-rustable material.

In operation, a place to locate the trap is found. Reference is made to trap 10 and its parts regarding operation, but is the same for trap 10a except where noted. If using the ground to assist in the setting of the trap, the trap 10 is set placing the front of the trap 10 closest to the ground with the front edge 32 of the top plate 30 abutting the ground such that the back of the main plate portion 98 of the setting plate 18 is facing upward. The user then presses his or her hand or foot against the main plate portion 98 of the setting plate 18 against the resistance of the springs 96, 97. When moved far enough, the main plate portion 98 will abut the press member 58 of the dog 52, causing the dog to rotate slightly and allowing the top of the main plate portion 98 to engage with the latch 56 of the dog 52. Alternatively, the dog 52a of trap 10a is held in a latching position by spring 150, allowing the main plate portion 98a to engage with latch 56a.

The setting member 18 is moved far enough such that the top of the main plate portion 98 of the setting plate 18 is located inwardly of the outer member 66. The trap 10 is then released by the user, causing the spring 96 via arm 96' and the spring 97 via arm 97' to bias the top of the setting plate 18 outwardly, such that the top of the setting plate 18 engages the shoulder 70 of the latch 56. The setting plate 18 is thereby held in place in a "set" position. The trap 10 can also be set by holding the trap with both hands and squeezing the top of the setting plate 18 toward the enclosure body 12 until it engages with the latch 56 and is in the "set" position.

The trap 10 is then lifted by the user and either staked into the ground using support stake 20 or placed within the base 120, by inserting the support stake 20 into the holster 126, which may be placed on the ground or attached to a structure. A secondary stake, if used, is then staked into the ground. Bait, for instance dog food, is then placed in the interior 26 of the enclosure body 12.

Because the enclosure body 12 is preferably sized and shaped such that a raccoon or other animal to be trapped cannot insert its snout into the interior 26 of the enclosure body 12 to get to the bait, the animal will likely insert a paw into the enclosure body 12 for the bait. When the animal does so, the paw will engage the blade portion 74 of the trigger 72. Moving the trigger 72 up or down a slight amount will cause the end 79 of the bow 76 to abut the leg 60 of the dog 52, pushing the bottom portion of the leg 60 away from the enclosure body 12. When the trigger 72 is moved enough, the dog 52, and in particular the latch 56, will be rotated far enough to cause release of the setting plate 18 from the latch 56 of the dog 52. The biasing force of the coil spring 96 will move the top portion of the setting plate 18 away from the enclosure body 12, rotating about spring rod 94, and in turn move the restraint 14 from the front of the enclosure body 12 toward the rear of the enclosure body 12. The restraint 14 will engage the leg or paw of the animal, and the biasing force of the springs 96, 97 will hold the lower leg or paw of the animal in place in the interior 26 of the enclosure body 12 between the restraint 14 and the rear of the enclosure body 12 and offset bar 28. When the user finds the trap with the trapped animal, the user may then either insert one or more fingers into the interior 26 of the enclosure body, or move the top of the setting plate 18 toward the enclosure body 12, to move the restraint 14 slightly to allow the paw of the animal to be removed from the trap 10.

The above-described animal traps and methods of use allow a user to easily set the animal traps either by using hands alone or using the ground for assistance. The animal traps also provide the advantage of "firing" and trapping an animal whether the trigger is moved either in an upwardly or downwardly fashion, making it more likely to be effective.

Although particular preferred embodiments of the invention have been disclosed in detail for illustrative purposes, it will be recognized that variations or modifications of the disclosed apparatus, including the rearrangement of parts, lie within the scope of the present invention.

The invention claimed is:

1. An animal trap comprising:
an enclosure body having a top, a first side, a second side, a bottom, and a wall defining an interior and an exterior;
a set dog having an upper end and a lower end, the set dog being adjacent to the first side of the enclosure body, the set dog having a latch adjacent the top of the enclosure body;
a rod connected to the enclosure body and disposed adjacent the exterior of the enclosure body;
a trigger in engagement with the rod in such a way to allow movement of the trigger, the trigger extending into the interior of the enclosure body, the trigger having an end adjacent the set dog and capable of engaging and moving the set dog;
a setting member sized and shaped for contact and movement by a human hand and having an end edge portion configured to engage and disengage with the latch of the set dog, and connected to a restraint having an engagement portion which is located in the interior of the enclosure body, the setting member connected to the enclosure body, and being rotatable about an axis adjacent the bottom of the enclosure body, the axis being stationary with respect to the enclosure body throughout a range of rotation of the setting member about the axis; and
a biasing member which biases a portion of the setting member away from the enclosure body and biases the engagement portion of the restraint toward the first side of the enclosure body, the trigger capable of being moved in a first direction substantially toward the top and in a second direction substantially away from the top, when the trigger is moved in the first direction, the trigger engages the set dog and causes the set dog to move and to release the setting member from the latch, and when the trigger is moved in the second direction, the trigger engages the set dog and causes the set dog to move and to release the setting member from the latch.

2. The animal trap of claim 1, and further including a top plate attached to the wall of the enclosure body, the top plate having a straight front portion adjacent the second side of the enclosure body.

3. The animal trap of claim 2, and further including a dog post which is connected to the enclosure body and connected to the set dog.

4. The animal trap of claim 3, wherein the set dog is rotatably mounted to the dog post.

5. The animal trap of claim 1, further comprising a second rod engaged with the setting member.

6. The animal trap of claim 1, wherein the set dog comprises an arm disposed for engagement with the setting member when the trap is being set.

7. The animal trap of claim 1, wherein the biasing member engages directly with the setting member.

8. The animal trap of claim 1, wherein the trigger and the set dog are not in permanent engagement with each other.

9. The animal trap of claim 1, wherein the animal trap is configured such that when the trigger is moved in the first direction, the trigger engages the set dog and moves a portion of the set dog away from the enclosure.

10. The animal trap of claim 9, wherein the animal trap is configured such that when the trigger is moved in the second direction, the trigger engages the set dog and moves a portion of the set dog away from the enclosure.

11. An animal trap comprising:
an enclosure body having an enclosure longitudinal axis defining an enclosure longitudinal direction, a first side and a second side, and at least one wall, the at least one wall having at least one upper aperture and at least one lower aperture therein, the enclosure body having an enclosure first end and an enclosure second end in the enclosure longitudinal direction, the enclosure body having an opening at the enclosure first end;
a set dog pivotally connected to the enclosure body adjacent the first side of the enclosure body and adjacent the enclosure first end, the set dog having a first set dog end adjacent the enclosure first end and a second set dog end opposite the first set dog end, the set dog also having a latch portion adjacent the set dog first end and a leg connected to the latch portion, the leg having a leg longitudinal axis, the leg being capable of being positioned such that the leg longitudinal axis is substantially parallel to the enclosure longitudinal axis;
a connection member connected to an exterior of the enclosure body;
a trigger having a trigger first end and a trigger second end, the trigger first end disposed adjacent the at least one lower aperture and the leg of the set dog for moving the set dog by engagement therewith, the trigger first end engaging the connection member to retain the trigger, the trigger second end disposed inside the enclosure body and movable in at least a first firing direction along an arc and a second firing direction along the arc, the second firing direction being opposite to the first firing direction;
a setting member movably connected to the enclosure body and configured to engage the latch portion of the set dog and being capable of disengaging from the latch portion of the set dog;
a restraint extending through the at least one upper aperture in the at least one wall of the enclosure body and having an engagement portion inside the enclosure body, the restraint being connected to the setting member; and
a biasing member which biases a portion of the setting member away from the enclosure body and biases the engagement portion of the restraint toward the first side of the enclosure body,
the leg of the set dog extending between the setting member and the enclosure body, and when the second end of the trigger is moved an effectual disengagement distance in the first firing direction the trigger engages and moves a portion of the leg to cause disengagement of the setting member from the latch of the set dog, and when the second end of the trigger is moved an effectual disengagement distance in the second firing direction the trigger engages and moves a portion of the leg to cause disengagement of the setting member from the latch of the set dog.

12. The animal trap of claim 11, wherein the enclosure body is substantially cylindrical in shape.

13. The animal trap of claim 11, wherein the setting member comprises a plate.

14. The animal trap of claim 11, wherein the set dog comprises a member disposed for engagement with the setting member when the trap is being set.

15. The animal trap of claim 14, wherein the member of the set dog is positioned below the latch of the set dog when the longitudinal axis of the enclosure body is oriented vertically.

16. The animal trap of claim 11, wherein the trigger first end is flat.

17. The animal trap of claim 11, and further including a top plate attached to the at least one wall of the enclosure body, the top plate having a straight front portion adjacent the second side of the enclosure body.

18. The animal trap of claim 11, wherein the second end of the trigger is substantially straight.

19. The animal trap of claim 11, wherein the leg of the set dog extends to and past the at least one lower aperture.

\* \* \* \* \*